US008827507B2

(12) United States Patent
Van De Ven et al.

(10) Patent No.: US 8,827,507 B2
(45) Date of Patent: Sep. 9, 2014

(54) LIGHTING ASSEMBLIES, METHODS OF INSTALLING SAME, AND METHODS OF REPLACING LIGHTS

(75) Inventors: Antony Paul Van De Ven, Hong Kong (CN); Gerald H. Negley, Durham, NC (US)

(73) Assignee: Cree, Inc., Durham, NC (US)

( * ) Notice: Subject to any disclaimer, the term of this patent is extended or adjusted under 35 U.S.C. 154(b) by 71 days.

(21) Appl. No.: 11/859,048

(22) Filed: Sep. 21, 2007

(65) Prior Publication Data

US 2008/0084701 A1 Apr. 10, 2008

Related U.S. Application Data

(60) Provisional application No. 60/846,222, filed on Sep. 21, 2006.

(51) Int. Cl.

| | |
|---|---|
| ***B60Q 1/06*** | (2006.01) |
| ***F21S 6/00*** | (2006.01) |
| ***F21V 15/00*** | (2006.01) |
| ***F21S 8/02*** | (2006.01) |
| ***F21V 17/16*** | (2006.01) |
| ***F21V 23/02*** | (2006.01) |
| ***F21V 29/00*** | (2006.01) |
| *F21Y 101/02* | (2006.01) |
| *F21Y 105/00* | (2006.01) |

(52) U.S. Cl.

CPC ................. *F21S 8/02* (2013.01); *F21V 17/164* (2013.01); *F21V 23/026* (2013.01); *F21V 29/004* (2013.01); *F21V 29/2275* (2013.01); *F21V 29/24* (2013.01); *F21Y 2101/02* (2013.01); *F21Y 2105/001* (2013.01)

USPC ............................ 362/373; 362/364; 362/147

(58) Field of Classification Search

CPC ..... F21Y 2101/02; F21V 29/004; F21S 8/026

USPC .................................. 362/147–150, 364, 373

See application file for complete search history.

(56) References Cited

U.S. PATENT DOCUMENTS 3,052,749 A 9/1962 Milton et al.
3,263,023 A 7/1966 Staley (Continued)

FOREIGN PATENT DOCUMENTS

DE 195 28 459 2/1997
EP 1 174 307 1/2002

(Continued)

OTHER PUBLICATIONS

U.S. Appl. No. 11/939,059, filed Nov. 13, 2007.

(Continued)

*Primary Examiner* — David J Makiya

(74) *Attorney, Agent, or Firm* — Burr & Brown, PLLC

(57) ABSTRACT

A lighting assembly comprising a light engine housing, a circuit board, a heat transfer material, an electrically conductive leg and a solid state light emitter. The emitter is in contact with a first end of the leg. The leg extends through the circuit board. A second end of the leg extends into the heat transfer material. Also, a lighting assembly as described above, which further comprises a fixture housing, in which the heat transfer material is in contact with the light engine housing and the light engine housing is connected to the fixture housing. In addition, a method of installing a lighting assembly, comprising connecting an electrical conductor and inserting the lighting assembly through a hole in a construction element such that clips attached to a fixture housing engage the construction element. Also, a method of changing a light emitter in a lighting assembly.

41 Claims, 9 Drawing Sheets

(56) References Cited

U.S. PATENT DOCUMENTS

| | | | | |
|---|---|---|---|---|
| 4,689,442 | A | 8/1987 | Ozaki | |
| 5,116,689 | A | 5/1992 | Castro et al. | |
| 5,400,229 | A * | 3/1995 | Lin | 362/249.02 |
| 5,567,041 | A * | 10/1996 | Slocum | 362/148 |
| 5,632,551 | A | 5/1997 | Roney et al. | |
| 5,808,592 | A * | 9/1998 | Mizutani et al. | 345/83 |
| 5,826,970 | A * | 10/1998 | Keller et al. | 362/147 |
| 5,850,126 | A | 12/1998 | Kanbar | |
| 5,876,831 | A | 3/1999 | Rawal | |
| 5,941,625 | A * | 8/1999 | Morand | 362/148 |
| 6,045,240 | A * | 4/2000 | Hochstein | 362/294 |
| 6,161,910 | A * | 12/2000 | Reisenauer et al. | 315/309 |
| 6,278,607 | B1 | 8/2001 | Moore et al. | |
| 6,340,868 | B1 | 1/2002 | Lys et al. | |
| 6,350,043 | B1 * | 2/2002 | Gloisten | 362/287 |
| 6,375,338 | B1 * | 4/2002 | Cummings et al. | 362/276 |
| 6,435,691 | B1 * | 8/2002 | Macey et al. | 362/101 |
| 6,441,943 | B1 | 8/2002 | Roberts et al. | |
| 6,482,520 | B1 | 11/2002 | Tzeng | |
| 6,578,986 | B2 | 6/2003 | Swaris et al. | |
| 6,578,994 | B1 * | 6/2003 | Beyerlein | 362/490 |
| 6,595,656 | B2 * | 7/2003 | Yoda | 362/187 |
| 6,659,632 | B2 | 12/2003 | Chen | |
| 6,712,486 | B1 | 3/2004 | Popovich et al. | |
| 6,740,972 | B2 | 5/2004 | Smith et al. | |
| 6,788,541 | B1 | 9/2004 | Hsiung | |
| 6,789,921 | B1 | 9/2004 | Deloy et al. | |
| 6,791,257 | B1 | 9/2004 | Sato et al. | |
| 6,800,932 | B2 | 10/2004 | Lam et al. | |
| 6,805,474 | B2 | 10/2004 | Walser et al. | |
| 6,846,093 | B2 | 1/2005 | Swaris et al. | |
| 6,864,573 | B2 | 3/2005 | Robertson et al. | |
| 6,871,983 | B2 * | 3/2005 | Jacob et al. | 362/364 |
| 6,880,954 | B2 | 4/2005 | Ollet et al. | |
| 6,949,772 | B2 | 9/2005 | Shimizu et al. | |
| 7,014,336 | B1 | 3/2006 | Ducharme et al. | |
| 7,030,486 | B1 | 4/2006 | Marshall | |
| 7,095,110 | B2 | 8/2006 | Arik et al. | |
| 7,121,688 | B2 | 10/2006 | Rempel | |
| 7,144,140 | B2 | 12/2006 | Sun et al. | |
| 7,210,832 | B2 | 5/2007 | Huang | |
| 7,213,940 | B1 | 5/2007 | Van De Ven et al. | |
| 7,226,189 | B2 | 6/2007 | Lee et al. | |
| 7,234,844 | B2 | 6/2007 | Bolta et al. | |
| 7,258,475 | B2 | 8/2007 | Kurumatani | |
| 7,284,874 | B2 | 10/2007 | Jeong et al. | |
| 7,566,154 | B2 * | 7/2009 | Gloisten et al. | 362/545 |
| 8,079,736 | B2 * | 12/2011 | Inoue et al. | 362/297 |
| 8,136,965 | B2 * | 3/2012 | Pickard et al. | 362/294 |
| 2003/0067778 | A1 | 4/2003 | Vernusset et al. | |
| 2003/0189831 | A1 | 10/2003 | Yoneda | |
| 2003/0210554 | A1 * | 11/2003 | Broelemann | 362/471 |
| 2003/0218878 | A1 | 11/2003 | Swaris et al. | |
| 2004/0105247 | A1 | 6/2004 | Calvin et al. | |
| 2004/0208009 | A1 * | 10/2004 | Mardon et al. | 362/373 |
| 2005/0051789 | A1 | 3/2005 | Negley et al. | |
| 2005/0077525 | A1 | 4/2005 | Lynch et al. | |
| 2005/0094105 | A1 | 5/2005 | Otsuka et al. | |
| 2005/0111234 | A1 | 5/2005 | Martin et al. | |
| 2005/0128751 | A1 | 6/2005 | Robarge et al. | |
| 2005/0168986 | A1 | 8/2005 | Wegner | |
| 2005/0174780 | A1 | 8/2005 | Park | |
| 2005/0225966 | A1 | 10/2005 | Hartmann, Jr. et al. | |
| 2005/0237739 | A1 | 10/2005 | Lee et al. | |
| 2006/0061539 | A1 | 3/2006 | Song et al. | |
| 2006/0098440 | A1 | 5/2006 | Allen | |
| 2006/0146531 | A1 * | 7/2006 | Reo et al. | 362/244 |
| 2006/0187660 | A1 | 8/2006 | Liu | |
| 2006/0221620 | A1 * | 10/2006 | Thomas | 362/364 |
| 2007/0074755 | A1 | 4/2007 | Eberspacher et al. | |
| 2007/0247414 | A1 | 10/2007 | Roberts | |
| 2007/0268707 | A1 * | 11/2007 | Smester | 362/362 |
| 2009/0097249 | A1 * | 4/2009 | Lee et al. | 362/249.02 |

FOREIGN PATENT DOCUMENTS

| | | |
|---|---|---|
| EP | 1 310 730 | 5/2003 |
| EP | 1 600 691 | 11/2005 |
| EP | 1 674 792 | 6/2006 |
| JP | 09-055457 | 2/1997 |
| JP | 11-264668 | 9/1999 |
| WO | 2008079161 | 7/2008 |

OTHER PUBLICATIONS

Cree, Inc., "Cree® Xlamp® 7090 XR-E Series LED Binning and Labeling," Application Note: CLD-AP08.000, 7pp (2006).
Cree, Inc., "Cree® Xlamp® 7090 XR-E Series LED Data Sheet," Datasheet: CLD-DS05.000, 10 pp (2006).
Cree, Inc., "Cree® Xlamp® 7090 XR-E Series LED Secondary Optics," Datasheet: CLD-DS07.000, 3 pp (2004-2006).
McMaster-Carr Supply Company, "Multipurpose Aluminum (Alloy 6061), specification sheets," Retrieved Dec. 14, 2006 from www.mcmaster.com/param/asp/Psearch2.asp?regTyp=parametric&act=psearch%F . . . , 3 pp.
U.S. Appl. No. 11/613,692, filed Dec. 20, 2006.
U.S. Appl. No. 11/614,180, filed Dec. 21, 2006.
U.S. Appl. No. 11/613,714, filed Dec. 20, 2006.
U.S. Appl. No. 11/613,733, filed Dec. 20, 2006.
U.S. Appl. No. 11/624,811, filed Jan. 19, 2007.
U.S. Appl. No. 11/626,483, filed Jan. 24, 2007.
U.S. Appl. No. 11/743,754, filed May 3, 2007.
U.S. Appl. No. 11/751,982, filed May 22, 2007.
U.S. Appl. No. 11/753,103, filed May 24, 2007.
U.S. Appl. No. 11/751,990, filed May 22, 2007.
U.S. Appl. No. 11/736,761, filed Apr. 18, 2007.
U.S. Appl. No. 11/736,799, filed Apr. 18, 2007.
U.S. Appl. No. 11/737,321, filed Apr. 19, 2007.
U.S. Appl. No. 11/755,162, filed May 30, 2007.
U.S. Appl. No. 11/854,744, filed Sep. 13, 2007.
U.S. Appl. No. 11/936,163, filed Nov. 7, 2007.
U.S. Appl. No. 11/948,021, filed Nov. 30, 2007.
U.S. Appl. No. 11/870,679, filed Oct. 11, 2007.
U.S. Appl. No. 11/951,626, filed Dec. 6, 2007.
U.S. Appl. No. 12/035,604, filed Feb. 22, 2008.
U.S. Appl. No. 11/939,052, filed Nov. 13, 2007.
U.S. Appl. No. 11/877,038, filed Oct. 23, 2007.
U.S. Appl. No. 11/948,041, filed Nov. 30, 2007.
U.S. Appl. No. 11/843,243, filed Aug. 22, 2007.
U.S. Appl. No. 11/673,951, filed Feb. 12, 2007.
U.S. Appl. No. 11/379,709, filed Apr. 21, 2006.
U.S. Appl. No. 11/379,726, filed Apr. 21, 2006.
U.S. Appl. No. 11/408,767, filed Apr. 21, 2006.

* cited by examiner

LIGHTING ASSEMBLIES, METHODS OF INSTALLING SAME, AND METHODS OF REPLACING LIGHTS

CROSS-REFERENCE TO RELATED APPLICATIONS

This application claims the benefit of U.S. Provisional Patent Application No. 60/846,222, filed Sep. 21, 2006, the entirety of which is incorporated herein by reference.

FIELD OF THE INVENTION

The present invention relates to lighting assemblies for emitting light, methods of installing lighting assemblies and methods of replacing light emitters included in lighting assemblies. In some embodiments, the present invention relates to lighting assemblies which include solid state light emitters, for example, light emitting diodes.

BACKGROUND OF THE INVENTION

A large proportion (some estimates are as high as twenty-five percent) of the electricity generated in the United States each year goes to lighting. Accordingly, there is an ongoing need to provide lighting which is more energy-efficient. It is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours). Fluorescent bulbs have longer lifetimes (e.g., 10,000-20,000 hours) than incandescent lights, but provide less favorable color reproduction.

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Also, there is an ongoing need to provide lighting assemblies which can be installed and/or repaired more easily, with less modification of or damage to construction elements (e.g., ceilings, walls and floors) in which such lighting assemblies are mounted, and in which light emitters can be more easily changed.

Additionally, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide lighting assemblies (which include light emitting diodes or other solid state light emitters) which are improved, e.g., with respect to energy efficiency, color rendering index (CRI Ra), contrast, efficacy (lm/W), and/or duration of service.

Although the development of light emitting diodes has in many ways revolutionized the lighting industry, some of the characteristics of light emitting diodes have presented challenges, some of which have not yet been fully met.

BRIEF SUMMARY OF THE INVENTION

In accordance with a first aspect according to the present invention, there is provided a lighting assembly, comprising:

a fixture housing;

a light engine housing;

a circuit board;

a heat transfer material;

at least a first electrically conductive leg; and at least a first solid state light emitter, the first solid state light emitter being in contact with a first end of the first electrically conductive leg, the first electrically conductive leg extending through the circuit board, a second end of the first electrically conductive leg extending into the heat transfer material, the heat transfer material being in contact with the light engine housing, the light engine housing being connected to the fixture housing.

In some embodiments according to this aspect of the present invention, the first solid state light emitter is an LED.

In accordance with a second aspect according to the present invention, there is provided a lighting assembly, comprising:

a light engine housing;

a circuit board;

a heat transfer material;

at least a first electrically conductive leg; and at least a first solid state light emitter, the first solid state light emitter being in contact with a first end of the first electrically conductive leg, the first electrically conductive leg extending through the circuit board, a second end of the first electrically conductive leg extending into the heat transfer material.

In some embodiments according to this aspect of the present invention, the first solid state light emitter is an LED.

In accordance with a third aspect according to the present invention, there is provided a method of installing a lighting assembly, comprising:

connecting an electrical conductor on a lighting assembly to an electrical supply component, the lighting assembly comprising a fixture housing and at least two clips attached to the fixture housing and extending away from a periphery of the fixture housing; and inserting the lighting assembly through a hole in a construction element such that the clips engage the construction element.

In some embodiments according to this aspect of the present invention, the first emitter is a solid state light emitter.

In some embodiments according to this aspect of the present invention, solid state light emitter is an LED.

In accordance with a fourth aspect according to the present invention, there is provided a method of changing a light emitter in a lighting assembly, comprising:

retracting clips attached to a fixture housing out of contact with a construction element;

moving the lighting assembly through a hole in a construction element; and disconnecting an electrical conductor on the lighting assembly from an electrical supply component, the lighting assembly comprising a fixture housing and at least two clips attached to the fixture housing and extending away from a periphery of the fixture housing.

In some embodiments according to this aspect of the present invention, the lighting assembly comprises a fixture housing, a light engine housing, a light engine and at least a first light emitter, the first light emitter being mounted on the light engine, the light engine being mounted on the light engine housing, and the method further comprises:

removing the light engine housing from the fixture housing;

removing the light engine from the light engine housing;

attaching a replacement light engine to the light engine housing; and attaching the light engine housing to the fixture housing.

In some such embodiments, the method further comprises inserting the lighting assembly through the hole in the construction element such that the clips engage the construction element.

In some embodiments according to this fourth aspect of the present invention, the lighting assembly comprises a fixture housing, a light engine housing, a light engine and at least a first light emitter, the first light emitter being mounted on the light engine, the light engine being mounted on the light engine housing, and the method further comprises:

removing the light engine housing from the fixture housing;

removing the first light emitter from the light engine;

attaching a replacement light emitter on the light engine; and attaching the light engine housing to the fixture housing.

In some embodiments according to this fourth aspect of the present invention, the lighting assembly comprises:

the fixture housing;

a light engine housing;

a circuit board;

a heat transfer material;

at least a first electrically conductive leg; and at least a first emitter, the first solid state light emitter is in contact with a first end of the first electrically conductive leg, the electrically conductive leg is electrically connected to the electrical conductor, the first electrically conductive leg extends through the circuit board, a second end of the first electrically conductive leg extends into the heat transfer material, the heat transfer material is in contact with the light engine housing, and the light engine housing is connected to the fixture housing.

The invention may be more fully understood with reference to the accompanying drawings and the following detailed description of the invention.

BRIEF DESCRIPTION OF THE DRAWING FIGURES

DETAILED DESCRIPTION OF THE INVENTION

Figure 1:
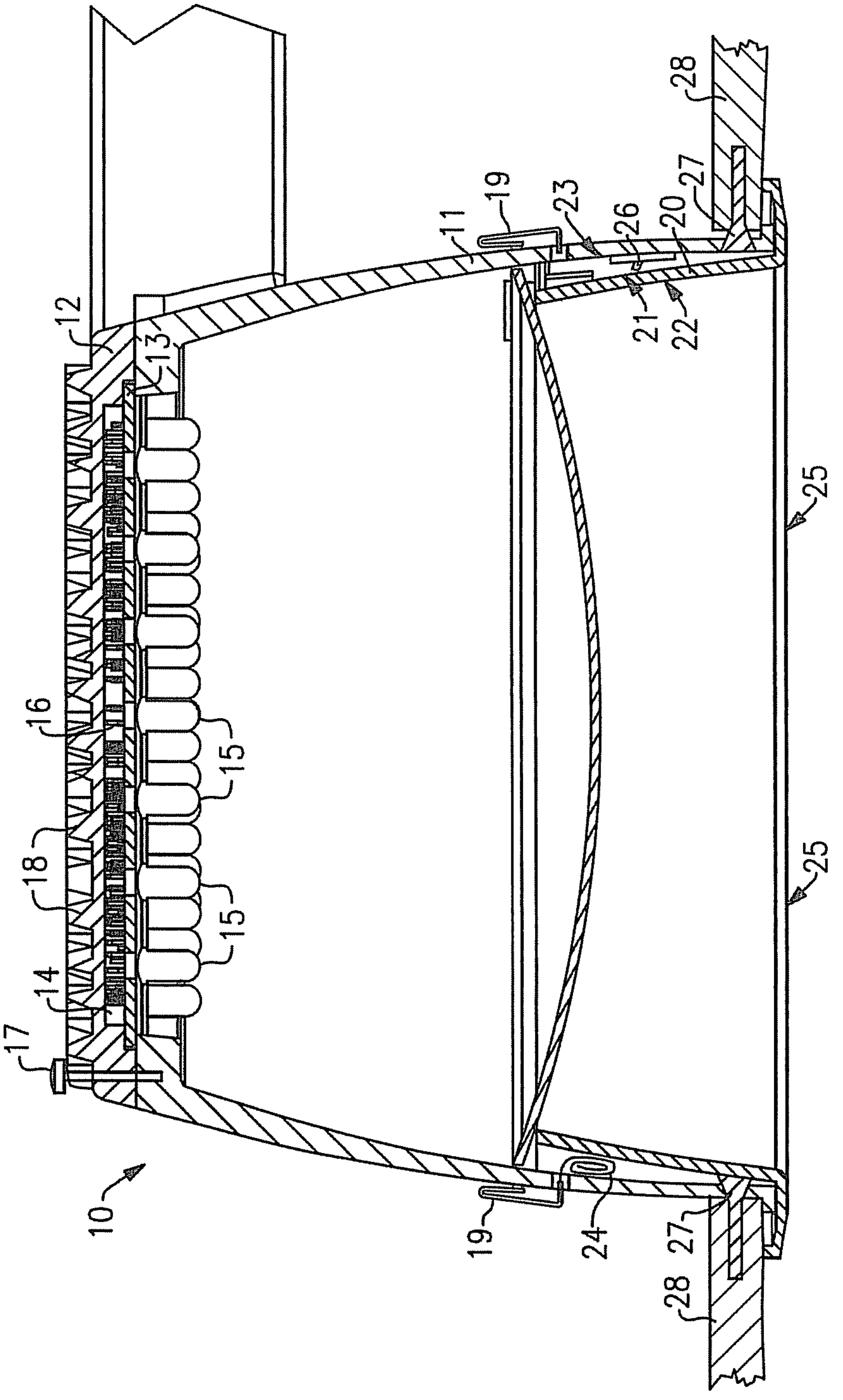
FIG. 1 depicts a first embodiment of a lighting assembly in accordance with the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A statement herein that two components in a device are "electrically connected," means that there are no components electrically between the components, the insertion of which materially affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board or another medium, are electrically connected.

The expression "mounted on", as used herein, means that the first structure which is "on" a second structure can be in contact with the second structure, or can be separated from the second structure by one or more intervening structures (each side, of opposite sides, of which is in contact with the first structure, the second structure or one of the intervening structures).

When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The expression "illumination" (or "illuminated"), as used herein when referring to a solid state light emitter, means that at least some current is being supplied to the solid state light emitter to cause the solid state light emitter to emit at least some light. The expression "illuminated" encompasses situations where the solid state light emitter emits light continuously or intermittently at a rate such that a human eye would perceive it as emitting light continuously, or where a plurality of solid state light emitters of the same color or different colors are emitting light intermittently and/or alternatingly (with or without overlap in "on" times) in such a way that a human eye would perceive them as emitting light continuously (and, in cases where different colors are emitted, as a mixture of those colors).

The expression "excited", as used herein when referring to a lumiphor, means that at least some electromagnetic radiation (e.g., visible light, UV light or infrared light) is contacting the lumiphor, causing the lumiphor to emit at least some light. The expression "excited" encompasses situations where the lumiphor emits light continuously or intermittently at a rate such that a human eye would perceive it as emitting light continuously, or where a plurality of lumiphors of the same color or different colors are emitting light intermittently and/or alternatingly (with or without overlap in "on" times) in such a way that a human eye would perceive them as emitting light continuously (and, in cases where different colors are emitted, as a mixture of those colors).

As used herein, the term "substantially," e.g., in the expressions "substantially conical", "substantially parallel", "substantially frustoconical", "substantially cylindrical", "substantially co-linear", "substantially coaxial", "substantially semi-elliptical", means at least about 90% correspondence with the feature recited, e.g.,

- "substantially parallel" means that two lines (or two planes) diverge from each other at most by an angle of 10% of 90 degrees, i.e., 9 degrees;
- "substantially semi-elliptical" means that a semi-ellipse can be drawn having the formula $x^2/a^2+y^1/b^2=1$, where $y\geq 0$, and imaginary axes can be drawn at a location where the y coordinate of each point on the structure is within 0.90 to 1.10 times the value obtained by inserting the x coordinate of such point into such formula;
- the expression "substantially coaxial" means that the axes of the respective surfaces come to within a distance of not more than 10% of the largest dimension of the respective surfaces, and that the respective axes define an angle of not greater than 10 degrees;
- the expression "substantially cylindrical", as used herein, means that at least 90% of the points in the surface which is characterized as being substantially cylindrical are located on one of or between a pair of imaginary cylindrical structures which are spaced from each other by a distance of not more than 10% of their largest dimension;
- the expression "substantially conical", as used herein, means that at least 90% of the points in the surface which is characterized as being substantially conical are located on one of or between a pair of imaginary conical structures which are spaced from each other by a distance of not more than 10% of their largest dimension;
- the expression "substantially frustoconical", as used herein, means that at least 90% of the points in the surface which is characterized as being substantially frustoconical are located on one of or between a pair of imaginary frustoconical structures which are spaced from each other by a distance of not more than 10% of their largest dimension; and
- the expression "co-linear", as used herein, means that two lines which are described as being co-linear are spaced from each other by not more than 10% of a largest dimension of any structure being described, and that coordinate axes can be defined such that respective x-y slopes of the two lines differ by not more than 10%, and respective x-z slopes of the two lines differ by not more than 10%.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As noted above, in a first aspect of the present invention, there is provided a lighting assembly, comprising:

- a fixture housing;
- a light engine housing;
- a circuit board;
- a heat transfer material;
- at least a first electrically conductive leg; and
- at least a first solid state light emitter.

The housing can be formed of any material which can be molded and/or shaped, a wide variety of which are well-known and readily available. Preferably, the housing is formed of a material which is an effective heat sink (i.e., which has high thermal conductivity and/or high heat capacity) and/or which is reflective (or which is coated with a reflective material). A representative example of a material out of which the fixture housing can be made is sheet metal.

The fixture housing can be any desired shape. A representative shape for the fixture housing is hollow cylindrical, e.g., as in conventional "can" light fixtures. Other representative shapes include hollow conical (or substantially conical), hollow frustoconical (or substantially frustoconical) and hollow semi-elliptical (or substantially semi-elliptical), or any shape which includes one or more portions which are individually selected from among hollow conical (or substantially conical), hollow frustoconical (or substantially frustoconical), hollow cylindrical (or substantially cylindrical) and hollow semi-elliptical (or substantially semi-elliptical).

In some embodiments, the fixture housing can include a reflective element (and/or one or more of its surfaces are reflective), so that light from some or all of the solid state light emitters is reflected by such reflective surfaces. Such reflective elements (and surfaces) are well-known and readily available to persons skilled in the art. A representative example of a suitable material out of which a reflective element can be made is a material marketed by Furukawa (a Japanese corporation) under the trademark MCPET®.

In some embodiments according to the present invention, the fixture housing is cylindrical and includes serrations, whereby a hole can be formed in a construction element (e.g., a wall, a floor or a ceiling) in which the fixture housing is being mounted by holding the fixture housing in contact with the construction element and rotating the fixture housing about its cylindrical axis so as to cut a hole in the construction element, the hole having about the same diameter as the fixture housing.

The light engine housing is connected to the fixture housing, and it can be made of any suitable material, a wide variety of which are well-known and readily available. Representative examples of materials out of which the light engine housing can be made are die cast aluminum, liquid crystal polymer, polyphenylene sulfide (PPS) or a composite material.

The light engine housing can be any desired shape. A representative shape for the light engine housing is cylindrical.

The circuit board can be made of any suitable material, a wide variety of which are well-known and readily available. Skilled artisans are very familiar with a wide variety of ways to construct circuit boards, and they have access to the materials needed to make such circuit boards. In addition, skilled artisans can readily design the conductive features needed to provide all of the electrical connections needed to operate any of the light engines described herein. Representative well-known types of circuit boards include layers of insulating material and conductive material, in which the insulating material is, for example, FR-4 (fiberglass impregnated with epoxy resin) or FR-2 (paper impregnated with phenolic resin) and/or polyimide, and in which the conductive material is etched copper sheets.

The heat transfer material can be made of any suitable material, a wide variety of which are well-known and readily available. A representative example of a suitable heat transfer material is a composition containing 50 to 85 percent by weight epoxy and 15 to 50 percent by weight SiC (silicon carbide)(e.g., #400 SiC).

The heat transfer material is in contact with the light engine housing, and can be in any desired shape. In some embodiments according to the present invention, the light engine housing and the circuit board together define a heat transfer space in which the heat transfer material is positioned (in some cases, the heat transfer material substantially or completely fills the heat transfer space, except for the space(s) occupied by leg(s) extending from the solid state light emitter(s) described below).

The one or more solid state light emitter can be any suitable solid state light emitter, a wide variety of which are well-known and readily available to persons skilled in the art. Solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made). The expression "solid state light emitter", as used herein, can refer to a component including one or more solid state light emitter or a component including one or more solid state light emitter as well as one or more lumiphor. In some embodiments according to the present invention, a lighting assembly includes one or more solid state light emitters which include at least one solid state light emitter and at least one lumiphor which emits light, at least a portion of such light emitted by the luminescent element being emitted in response to luminescent material in the luminescent element being excited by light emitted by the at least one solid state light emitter.

As noted above, one type of solid state light emitter which can be employed are LEDs. Such LEDs can be selected from among any light emitting diodes (a wide variety of which are readily obtainable and well known to those skilled in the art, and therefore it is not necessary to describe in detail such devices, and/or the materials out of which such devices are made). For instance, examples of types of light emitting diodes include inorganic and organic light emitting diodes, a variety of each of which are well-known in the art.

Representative examples of such LEDs, many of which are known in the art, can include lead frames, lumiphors, encapsulant regions, etc.

Representative examples of suitable LEDs are described in:

(1) U.S. Patent Application No. 60/753,138, filed on Dec. 22, 2005, entitled "Lighting Device" (inventor: Gerald H. Negley), the entirety of which is hereby incorporated by reference, and U.S. patent application Ser. No. 11/614,180, filed Dec. 21, 2006 (now U.S. Patent Publication No. 2007/023611);

(2) U.S. Patent Application No. 60/794,379, filed on Apr. 24, 2006, entitled "Shifting Spectral Content in LEDs by Spatially Separating Lumiphor Films" (inventors: Gerald H. Negley and Antony Paul van de Ven), the entirety of which is hereby incorporated by reference, and U.S. patent application Ser. No. 11/624,811, filed Jan. 19, 2007 now U.S. Patent Publication No. 2007/0170447);

(3) U.S. Patent Application No. 60/808,702, filed on May 26, 2006, entitled "Lighting Device" (inventors: Gerald H. Negley and Antony Paul van de Ven), the entirety of which is hereby incorporated by reference, and U.S. patent application Ser. No. 11/751,982, filed May 22, 2007 (now U.S. Patent Publication No. 2007/0274080);

(4) U.S. Patent Application No. 60/808,925, filed on May 26, 2006, entitled "Solid State Light Emitting Device and Method of Making Same" (inventors: Gerald H. Negley and Neal Hunter), the entirety of which is hereby incorporated by reference, and U.S. patent application Ser. No. 11/753,103, filed May 24, 2007 (now U.S. Patent Publication No. 2007/0280624);

(5) U.S. Patent Application No. 60/802,697, filed on May 23, 2006, entitled "Lighting Device and Method of Making" (inventor: Gerald H. Negley), the entirety of which is hereby incorporated by reference, and U.S. patent application Ser. No. 11/751,990, filed May 22, 2007 (now U.S. Patent Publication No. 2007/0274063);

(6) U.S. Patent Application No. 60/839,453, filed on Aug. 23, 2006, entitled "LIGHTING DEVICE AND LIGHTING METHOD" (inventors: Antony Paul van de Ven and Gerald H. Negley), the entirety of which is hereby incorporated by reference;

(7) U.S. Patent Application No. 60/857,305, filed on Nov. 7, 2006, entitled "LIGHTING DEVICE AND LIGHTING METHOD" (inventors: Antony Paul van de Ven and Gerald H. Negley, the entirety of which is hereby incorporated by reference;

(8) U.S. Patent Application No. 60/851,230, filed on Oct. 12, 2006, entitled "LIGHTING DEVICE AND METHOD OF MAKING SAME" (inventor: Gerald H. Negley, the entirety of which is hereby incorporated by reference.

Some embodiments according to the present invention include at least a first LED and at least a first lumiphor. In some such embodiments, the light emitted from the first LED has a peak wavelength in a range of from 430 nm to 480 nm, and the light emitted from the first lumiphor has a dominant wavelength in a range of from about 555 nm to about 585 nm.

Some embodiments according to the present invention include at least a first LED, at least a first lumiphor and at least a second LED. In some such embodiments, the light emitted from the first LED has a peak wavelength in a range of from 430 nm to 480 nm, and the light emitted from the first lumiphor has a dominant wavelength in a range of from about 555 nm to about 585 nm, and the light emitted from the second LED has a dominant wavelength in a range of from 600 nm to 630 nm.

Some embodiments according to the present invention include at least a first solid state light emitter (which, in some such embodiments includes at least a first LED and at least a first lumiphor) which, if illuminated, emits light which has x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38.

In general, light of any number of colors can be mixed by the lighting assemblies according to the present invention. Representative examples of blends of light colors are described in:

(1) U.S. Patent Application No. 60/752,555, filed Dec. 21, 2005, entitled "Lighting Device and Lighting Method" (inventors: Antony Paul Van de Ven and Gerald H. Negley), the entirety of which is hereby incorporated by reference, and U.S. patent application Ser. No. 11/613,714, filed Dec. 20, 2006 (now U.S. Patent Publication No. 2007/0139920);

(2) U.S. Patent Application No. 60/752,556, filed on Dec. 21, 2005, entitled "SIGN AND METHOD FOR LIGHTING" (inventors: Gerald H. Negley and Antony Paul van de Ven), the entirety of which is hereby incorporated by reference, and U.S. patent application Ser. No. 11/613,733, filed Dec. 20, 2006 (now U.S. Patent Publication No. 2007/0137074);

(3) U.S. Patent Application No. 60/793,524, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/736,761, filed Apr. 18, 2007 (now U.S. Patent Publication No. 2007/0278934);

(4) U.S. Patent Application No. 60/793,518, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/736,799, filed Apr. 18, 2007 (now U.S. Patent Publication No. 2007/0267983);

(5) U.S. Patent Application No. 60/793,530, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/737,321, filed Apr. 19, 2007 (now U.S. Patent Publication No. 2007/0278503);

(6) U.S. Pat. No. 7,213,940, issued on May 8, 2007, entitled "LIGHTING DEVICE AND LIGHTING METHOD" (inventors: Antony Paul van de Ven and Gerald H. Negley), the entirety of which is hereby incorporated by reference;

(7) U.S. Patent Application No. 60/868,134, filed on Dec. 1, 2006, entitled "LIGHTING DEVICE AND LIGHTING METHOD" (inventors: Antony Paul van de Ven and Gerald H. Negley), the entirety of which is hereby incorporated by reference;

(8) U.S. Patent Application No. 60/868,986, filed on Dec. 7, 2006, entitled "LIGHTING DEVICE AND LIGHTING METHOD" (inventors: Antony Paul van de Ven and Gerald H. Negley), the entirety of which is hereby incorporated by reference;

(9) U.S. Patent Application No. 60/857,305, filed on Nov. 7, 2006, entitled "LIGHTING DEVICE AND LIGHTING METHOD" (inventors: Antony Paul van de Ven and Gerald H. Negley, the entirety of which is hereby incorporated by reference; and

(10) U.S. Patent Application No. 60/891,148, filed on Feb. 22, 2007, entitled "LIGHTING DEVICE AND METHODS OF LIGHTING, LIGHT FILTERS AND METHODS OF FILTERING LIGHT" (inventor: Antony Paul van de Ven, the entirety of which is hereby incorporated by reference.

The lighting assemblies according to the present invention can comprise any desired number of solid state emitters. For example, a lighting assembly according to the present invention can include 50 or more light emitting diodes, or can include 100 or more light emitting diodes, etc. In general, with current light emitting diodes, greater efficiency can be achieved by using a greater number of smaller light emitting diodes (e.g., 100 light emitting diodes each having a surface area of 0.1 $mm^2$ vs. 25 light emitting diodes each having a surface area of 0.4 $mm^2$ but otherwise being identical).

Analogously, light emitting diodes which operate at lower current densities are generally more efficient. Light emitting diodes which draw any particular current can be used according to the present invention. In some embodiments of the present invention, light emitting diodes which each draw not more than 50 milliamps are employed.

As indicated above, some embodiments of the lighting assemblies according to the present invention can include lumiphors (i.e., luminescence region or luminescent element which comprises at least one luminescent material). The expression "lumiphor", as used herein, refers to any luminescent element, i.e., any element which includes a luminescent material.

A wide variety of luminescent materials (also known as lumiphors or luminophoric media, e.g., as disclosed in U.S. Pat. No. 6,600,175, the entirety of which is hereby incorporated by reference) are well-known and available to persons of skill in the art. For example, a phosphor is a luminescent material that emits a responsive radiation (e.g., visible light) when excited by a source of exciting radiation. In many instances, the responsive radiation has a wavelength which is different from the wavelength of the exciting radiation. Other examples of luminescent materials include scintillators, day glow tapes and inks which glow in the visible spectrum upon illumination with ultraviolet light.

Luminescent materials can be categorized as being down-converting, i.e., a material which converts photons to a lower energy level (longer wavelength) or up-converting, i.e., a material which converts photons to a higher energy level (shorter wavelength).

Inclusion of luminescent materials in LED devices has been accomplished by adding the luminescent materials to a clear or translucent encapsulant material (e.g., epoxy-based, silicone-based, glass-based or metal oxide-based material) as discussed above, for example by a blending or coating process.

For example, U.S. Pat. No. 6,963,166 (Yano '166) discloses that a conventional light emitting diode lamp includes a light emitting diode chip, a bullet-shaped transparent housing to cover the light emitting diode chip, leads to supply current to the light emitting diode chip, and a cup reflector for reflecting the emission of the light emitting diode chip in a uniform direction, in which the light emitting diode chip is encapsulated with a first resin portion, which is further encapsulated with a second resin portion. According to Yano '166, the first resin portion is obtained by filling the cup reflector with a resin material and curing it after the light emitting diode chip has been mounted onto the bottom of the cup reflector and then has had its cathode and anode electrodes electrically connected to the leads by way of wires. According to Yano '166, a phosphor is dispersed in the first resin portion so as to be excited with the light A that has been emitted from the light emitting diode chip, the excited phosphor produces fluorescence ("light B") that has a longer wavelength than the light A, a portion of the light A is transmitted through the first resin portion including the phosphor, and as a result, light C, as a mixture of the light A and light B, is used as illumination.

Each solid state light emitter typically is attached to one or two electrically conductive legs. In accordance with this aspect of the present invention, at least one solid state light emitter has at least one electrically conductive leg which extends through the circuit board and at least partially (e.g., 50%, 75%, 90% or more of the distance from the circuit board to a surface of the light engine housing which is opposite the circuit board relative to the heat transfer material) into the heat transfer material. The one or more electrically conductive legs are electrically connected to the circuit board by any suitable method, e.g., by soldering. The electrically conductive leg(s) can be formed in any suitable shape from any suitable material, a wide variety of which are well-known and available to persons skilled in the art. A representative material out of which the legs can be made is silver-plated copper (or silver-plated mild steel).

In some embodiments of this aspect of the invention, an axis of symmetry of the fixture housing is substantially co-linear with an axis of symmetry of the light engine housing. In some such embodiments, an axis of symmetry of the first leg is substantially parallel to the axis of symmetry of the light engine housing, and/or an axis of symmetry of the first solid state light emitter is substantially parallel to the axis of symmetry of the light engine housing.

In some embodiments of this aspect of the invention, the first solid state light emitter is an LED.

In some embodiments of this aspect of the invention, heat sink fins are provided, which extend from the light engine housing away from the heat transfer material. Such heat sink fins can be made of any suitable material, a wide variety of which will be readily apparent to persons skilled in the art.

In some embodiments of this aspect of the invention, the lighting assembly further includes at least two clips attached to the fixture housing and extending away from a periphery of the fixture housing. Such clips are designed such that the lighting assembly can, for example, be inserted through an opening in a construction element whereby the clips engage the construction element (or some other construction element) so that the lighting assembly is held in place.

In some embodiments of this aspect of the invention, the lighting assembly further comprises a rim which has an external surface which faces an internal surface of the fixture housing.

In some embodiments of this aspect of the invention, the lighting assembly further comprises clips as described above and at least a first drawstring which, when pulled, causes the clips to retract toward the periphery of the fixture housing in order to enable the lighting assembly to be released and removed from the construction element(s). In some such embodiments, the lighting assembly further comprises a rim as described above which obstructs the first drawstring from view through an opening defined by an internal surface of the rim.

In some embodiments of this aspect of the invention, the lighting assembly further comprises at least a first control device (e.g., a switch) attached to the fixture housing and a rim as described above, in which the rim obstructs the first control device from view through an opening defined by an internal surface of the rim.

In some embodiments of this aspect of the invention, the lighting assembly further comprises a rim as described above and one or more mounting screws which connect the fixture housing to a construction element, wherein an internal surface of the rim defines an opening through which light from the one or more solid state light emitter can pass, the rim obstructing the mounting screws from view through the opening.

As noted above, in a second aspect of the present invention, there is provided a lighting assembly, comprising:

a light engine housing;

a circuit board;

a heat transfer material;

at least a first electrically conductive leg; and at least a first solid state light emitter, the first solid state light emitter being in contact with a first end of the first electrically conductive leg, the first electrically conductive leg extending through the circuit board, and a second end of the first electrically conductive leg extending into the heat transfer material.

The discussion above regarding the light engine housings, the circuit boards, the heat transfer materials, the electrically conductive legs and the solid state light emitter which can be employed in accordance with the first aspect of the present invention apply to those items in accordance with the second aspect of the present invention.

As noted above, in a third aspect of the present invention, there is provided a method of installing a lighting assembly, comprising:

connecting an electrical conductor on a lighting assembly to an electrical supply component (e.g., an electrical wire), the lighting assembly comprising a fixture housing and at least two clips attached to the fixture housing and extending away from a periphery of the fixture housing; and inserting the lighting assembly through a hole in a construction element (e.g., a wall, a floor or a ceiling) such that the clips engage the construction element.

In some embodiments of this aspect of the invention, the method further comprises positioning a lens in the fixture housing and turning the lens, whereby the lens becomes engaged with the fixture housing and is held in place. In some such embodiments, the lens is turned by rotating the lens about an axis substantially coaxial with an axis of the fixture housing. Persons of skill in the art are familiar with a variety of lenses for lighting assemblies, a representative example being a standard diffusing element, e.g., a glass or plastic diffusing element about 0.2 mm thick.

In some embodiments of this aspect of the invention, the method further comprises positioning a rim such that an external surface of the rim faces an internal surface of the fixture housing. The discussion above regarding the rims which can be employed in accordance with the first aspect of the present invention applies to the rims which can be employed in accordance with the third aspect of the present invention.

In some embodiments of this aspect of the invention, the lighting assembly comprises:

the fixture housing;

a light engine housing;

a circuit board;

a heat transfer material;

at least a first electrically conductive leg; and at least a first emitter, the first solid state light emitter is in contact with a first end of the first electrically conductive leg, the electrically conductive leg is electrically connected to the electrical conductor, the first electrically conductive leg extends through the circuit board, a second end of the first electrically conductive leg extends into the heat transfer material, the heat transfer material is in contact with the light engine housing, and the light engine housing is connected to the fixture housing.

In some such embodiments, the first emitter is a solid state light emitter, e.g., an LED.

As noted above, in a fourth aspect of the present invention, there is provided a method of changing a light emitter in a lighting assembly, comprising:

retracting clips attached to a fixture housing out of contact with a construction element;

moving the lighting assembly through a hole in a construction element; and disconnecting an electrical conductor on the lighting assembly from an electrical supply component, the lighting assembly comprising a fixture housing and at least two clips attached to the fixture housing and extending away from a periphery of the fixture housing.

In some embodiments of this aspect of the invention, the method further comprises inserting the lighting assembly through the hole in the construction element such that the clips engage the construction element, or some other construction element, so as to hold the lighting assembly in place.

The expression "lighting assembly", as used herein, is not limited, except that it is capable of emitting light. That is, a lighting assembly can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

The present invention further relates to an illuminated enclosure (the volume of which can be illuminated uniformly or non-uniformly), comprising an enclosed space and at least one lighting assembly according to the present invention, wherein the lighting assembly illuminates at least a portion of the enclosure (uniformly or non-uniformly).

The present invention is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting assembly as described herein.

The lighting assemblies of the present invention can be supplied with electricity in any desired manner. Skilled artisans are familiar with a wide variety of power supplying apparatuses, and any such apparatuses can be employed in connection with the present invention. The lighting assemblies of the present invention can be electrically connected (or selectively electrically connected) to any desired power source, persons of skill in the art being familiar with a variety of such power sources.

Representative examples of apparatuses for supplying electricity to lighting assemblies and power supplies for lighting assemblies, all of which are suitable for the lighting assemblies of the present invention, are described in:

(1) U.S. Patent Application No. 60/752,753, filed on Dec. 21, 2005, entitled "Lighting Device" (inventors: Gerald H. Negley, Antony Paul van de Ven and Neal Hunter), the entirety of which is hereby incorporated by reference, and U.S. patent application Ser. No. 11/613,692, filed Dec. 20, 2006 (now U.S. Patent Publication No. 2007/0139923);

(2) U.S. Patent Application No. 60/798,446, filed on May 5, 2006, entitled "Lighting Device" (inventor: Antony Paul van de Ven), the entirety of which is hereby incorporated by reference, and U.S. patent application Ser. No. 11/743,754, filed May 3, 2007 (now U.S. Patent Publication No. 2007/0263393);

(3) U.S. Patent Application No. 60/809,959, filed on Jun. 1, 2006, entitled "Lighting Device With Cooling" (inventors: Thomas G. Coleman, Gerald H. Negley and Antony Paul van de Ven), the entirety of which is hereby incorporated by reference, and U.S. patent application Ser. No. 11/626,483, filed Jan. 24, 2007 (now U.S. Patent Publication No. 2007/0171145);

(4) U.S. Patent Application No. 60/809,595, filed on May 31, 2006, entitled "LIGHTING DEVICE AND METHOD OF LIGHTING" (inventor: Gerald H. Negley), the entirety of which is hereby incorporated by reference, and U.S. patent application Ser. No. 11/755,162, filed May 30, 2007 (now U.S. Patent Publication No. 2007/0279440); and (5) U.S. Patent Application No. 60/844,325, filed on Sep. 13, 2006, entitled "BOOST/FLYBACK POWER SUPPLY TOPOLOGY WITH LOW SIDE MOSFET CURRENT CONTROL" (inventor: Peter Jay Myers), the entirety of which is hereby incorporated by reference.

Embodiments in accordance with the present invention are described herein with reference to cross-sectional (and/or plan view) illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present invention.

FIG. 1 depicts a first embodiment of a lighting assembly in accordance with the present invention. Referring to FIG. 1, there is shown a lighting assembly 10 which includes a fixture housing 11, a light engine housing 12, a circuit board 13, a heat transfer material 14, a plurality of solid state light emitters 15 (in this embodiment, they are LEDs), each being in contact with a pair of electrically conductive legs 16.

The electrically conductive legs 16 extend through (and are soldered to) the circuit board 13 and into the heat transfer material 14. The heat transfer material 14 is in contact with the light engine housing 12. The light engine housing 12 is connected to the fixture housing 11 by screws 17.

Referring to FIG. 1, the heat transfer material 14 is positioned within a space defined between the light engine housing 12 and the circuit board 13.

Again referring to FIG. 1, an axis of symmetry of the fixture housing 11 is substantially co-linear with an axis of symmetry of the light engine housing 12.

Again referring to FIG. 1, axes of symmetry of the legs 16 are substantially parallel to the axis of symmetry of the light engine housing 12.

Again referring to FIG. 1, axes of symmetry of the solid state light emitters are substantially parallel to the axis of symmetry of the light engine housing 12.

The lighting assembly 10 also includes heat sink fins 18 which extend from the light engine housing 12 away from the heat transfer material 14.

The lighting assembly 10 also includes clips 19 which are attached to the fixture housing 11 and which extend away from a periphery of the fixture housing 11.

The lighting assembly 10 also includes a rim 20. The rim 20 has a rim external surface 21 and a rim internal surface 22. The fixture housing 11 has a fixture housing internal surface 23. The rim external surface 21 faces the fixture housing internal surface 23.

The lighting assembly 10 further includes a drawstring 24 which, when pulled, causes the clips 19 to retract toward the periphery of the fixture housing 11. Referring to FIG. 1, the rim 20 obstructs the drawstring 24 from view through an opening 25 defined by the rim internal surface 22.

The lighting assembly 10 further includes a control device 26 (in the form of a switch) attached to the fixture housing 11. The rim 20 obstructs the control device 26 from view through the opening 25.

The lighting assembly 10 further includes mounting screws 27 which connect the fixture housing 11 to a construction element 28. The rim 20 obstructs the mounting screws 27 from view through the opening 25.

The legs 16 extend into the heat transfer material 14 more than 90% of the distance from the circuit board 13 to the surface of the light engine housing 12 which is opposite the circuit board 13 relative to the heat transfer material 14.

Figure 2:
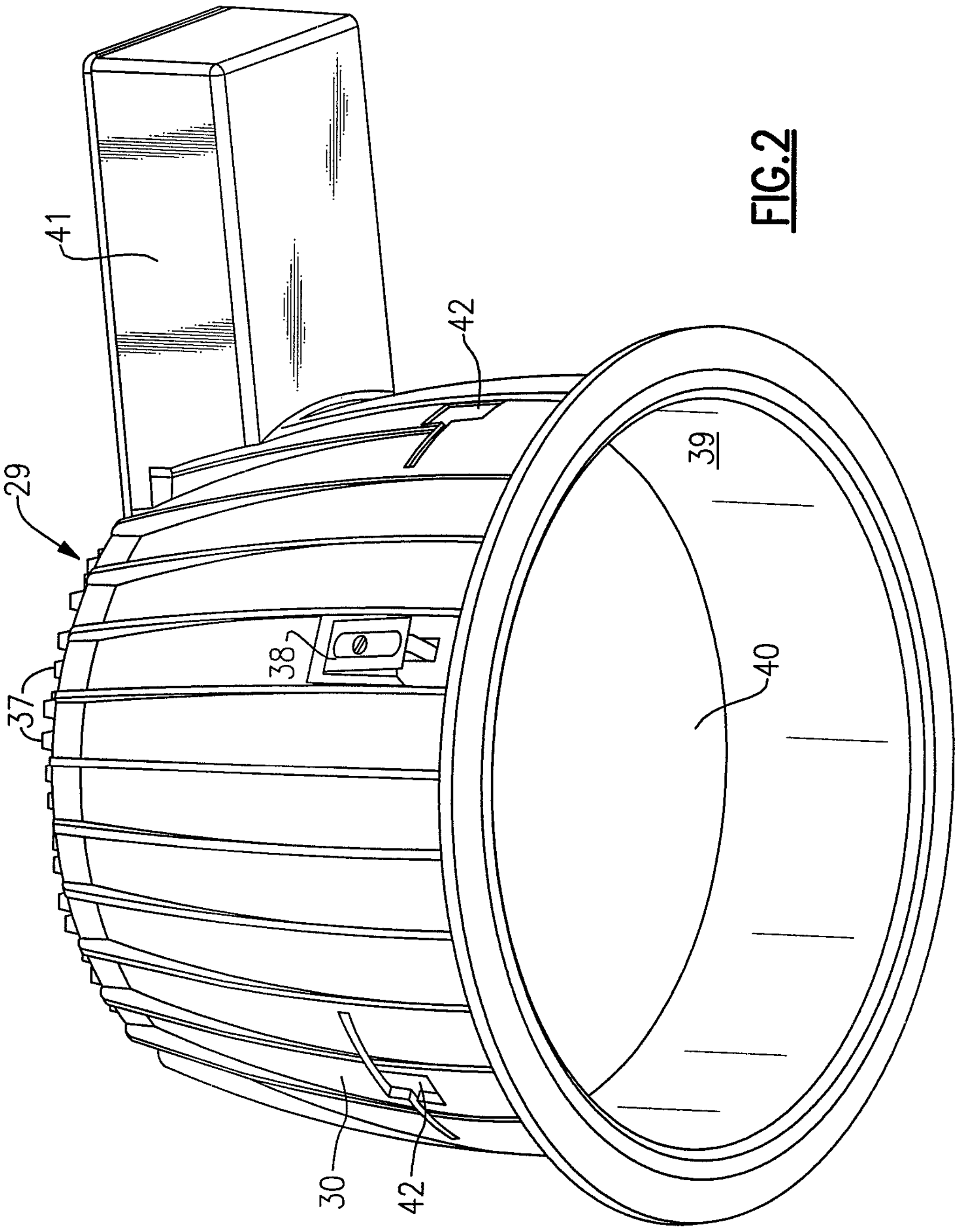
FIG. 2 is a perspective view of a lighting assembly.
Figure 3:
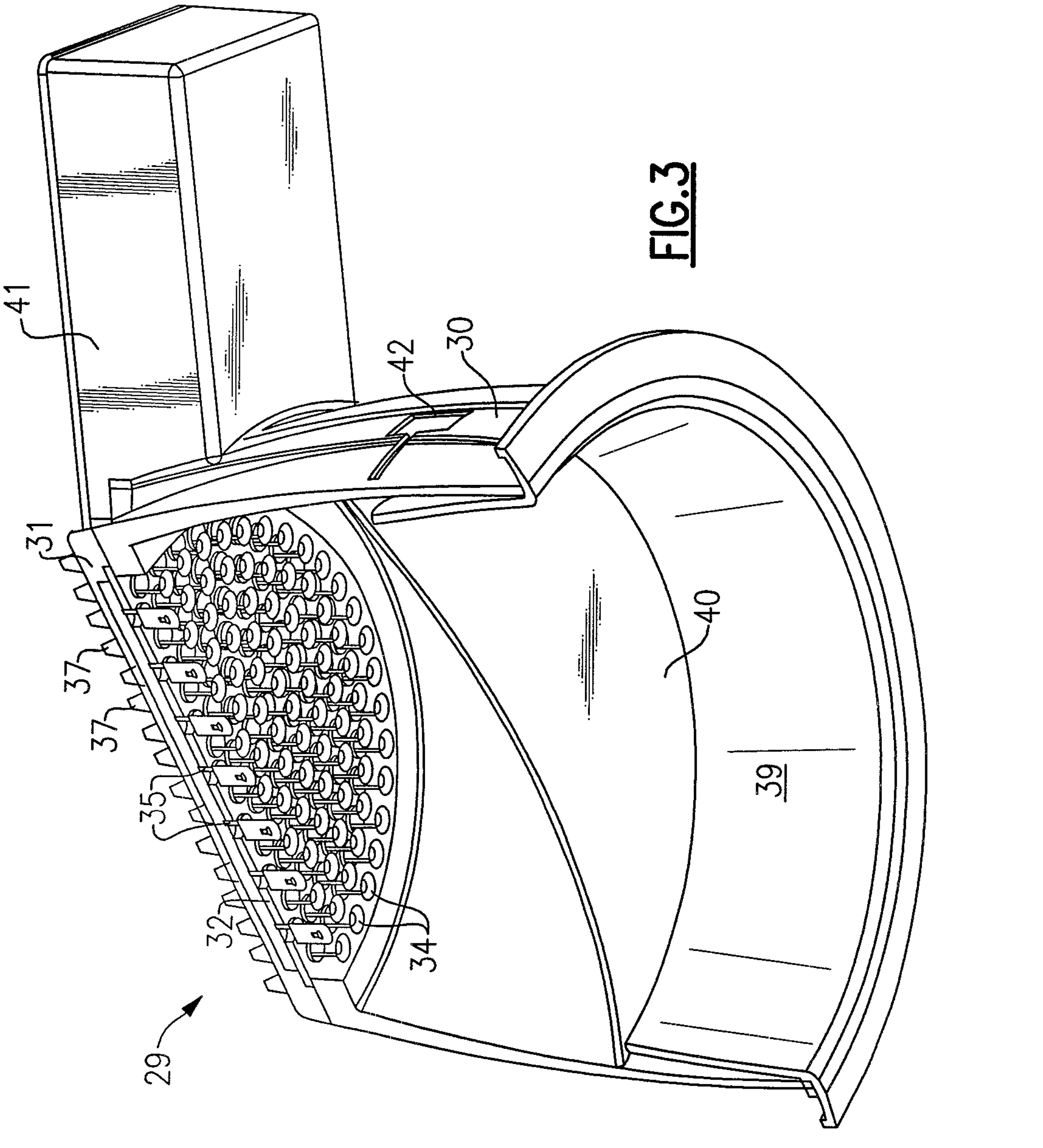
FIG. 3 is a cutaway perspective view of the lighting assembly depicted in FIG. 2.
Figure 4:
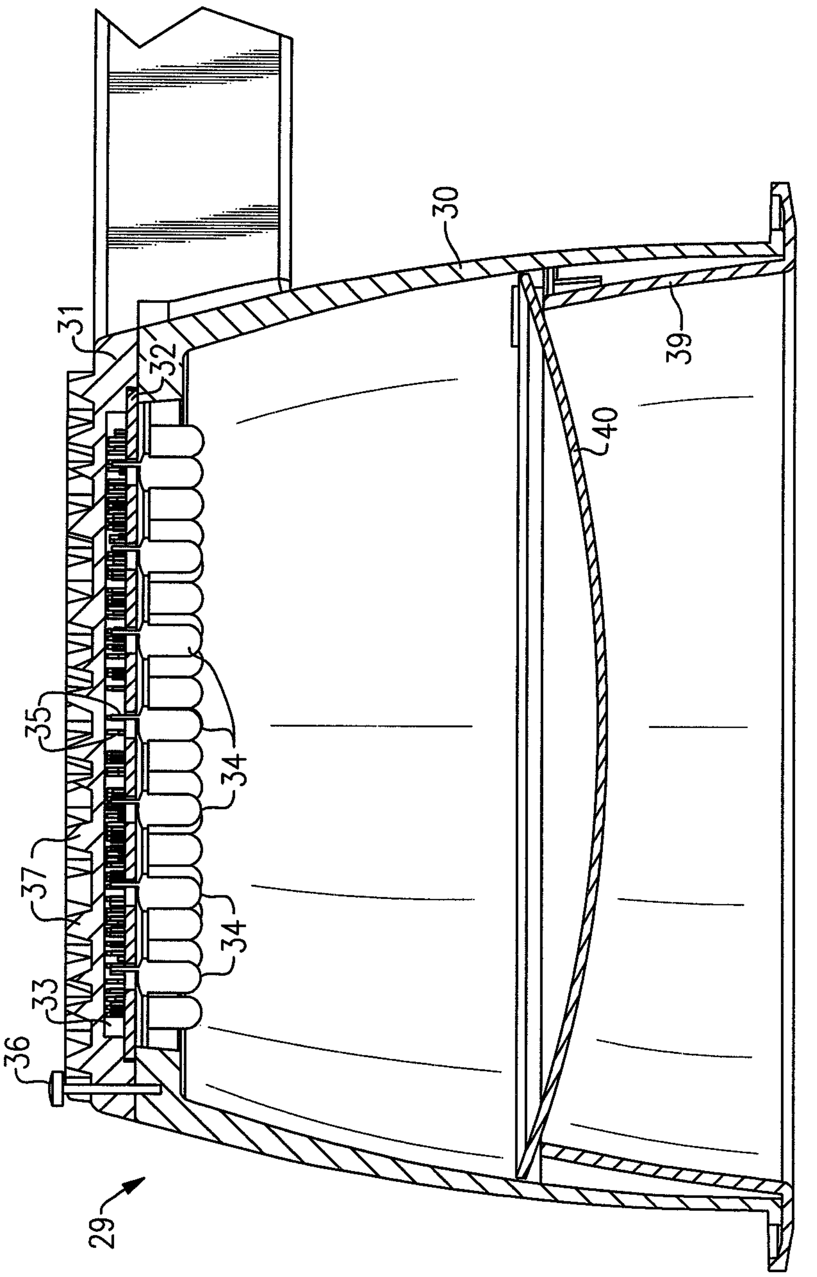
FIG. 4 is a sectional view of the lighting assembly depicted in FIG. 2.

FIGS. 2-11 depict a second embodiment of a lighting assembly according to the present invention. FIG. 2 is a perspective view of a lighting assembly 29, and FIG. 4 is a sectional view of the lighting assembly 29. Referring to FIG. 4, the lighting assembly 29 includes a fixture housing 30, a light engine housing 31, a circuit board 32, a heat transfer material 33, a plurality of solid state light emitters 34 (in this embodiment, they are LEDs), each being in contact with a pair of electrically conductive legs 35.

The electrically conductive legs 35 extend through the circuit board 32 and into the heat transfer material 33. The heat transfer material 33 is in contact with the light engine housing 31. The light engine housing 31 is connected to the fixture housing 30 by screws 36 (only one screw 36 is shown in FIG. 4).

The lighting assembly 29 also includes heat sink fins 37 which extend from the light engine housing 31 away from the heat transfer material 33.

The lighting assembly 29 also includes clips 38 (one of which is shown in FIG. 2) which are attached to the fixture housing 30 and which extend away from a periphery of the fixture housing 30.

The lighting assembly 29 also includes a rim 39.

The lighting assembly 29 also includes a lens 40, which can be inserted by positioning the lens 40 such that tabs which extend outward from the lens 40 engage corresponding gaps 42 in the fixture housing 30, and twisting the lens (clockwise or counter-clockwise) such that the tabs move within the gaps 42. The lens 40 can be removed by twisting in the opposite direction.

The lighting assembly 29 further includes a ballast 41 which converts AC current (e.g., 110 volts) into lower voltage DC current suitable for supplying to the solid state light emitters 34.

FIG. 3 is a cutaway perspective view of the lighting assembly 29.

Figure 5:
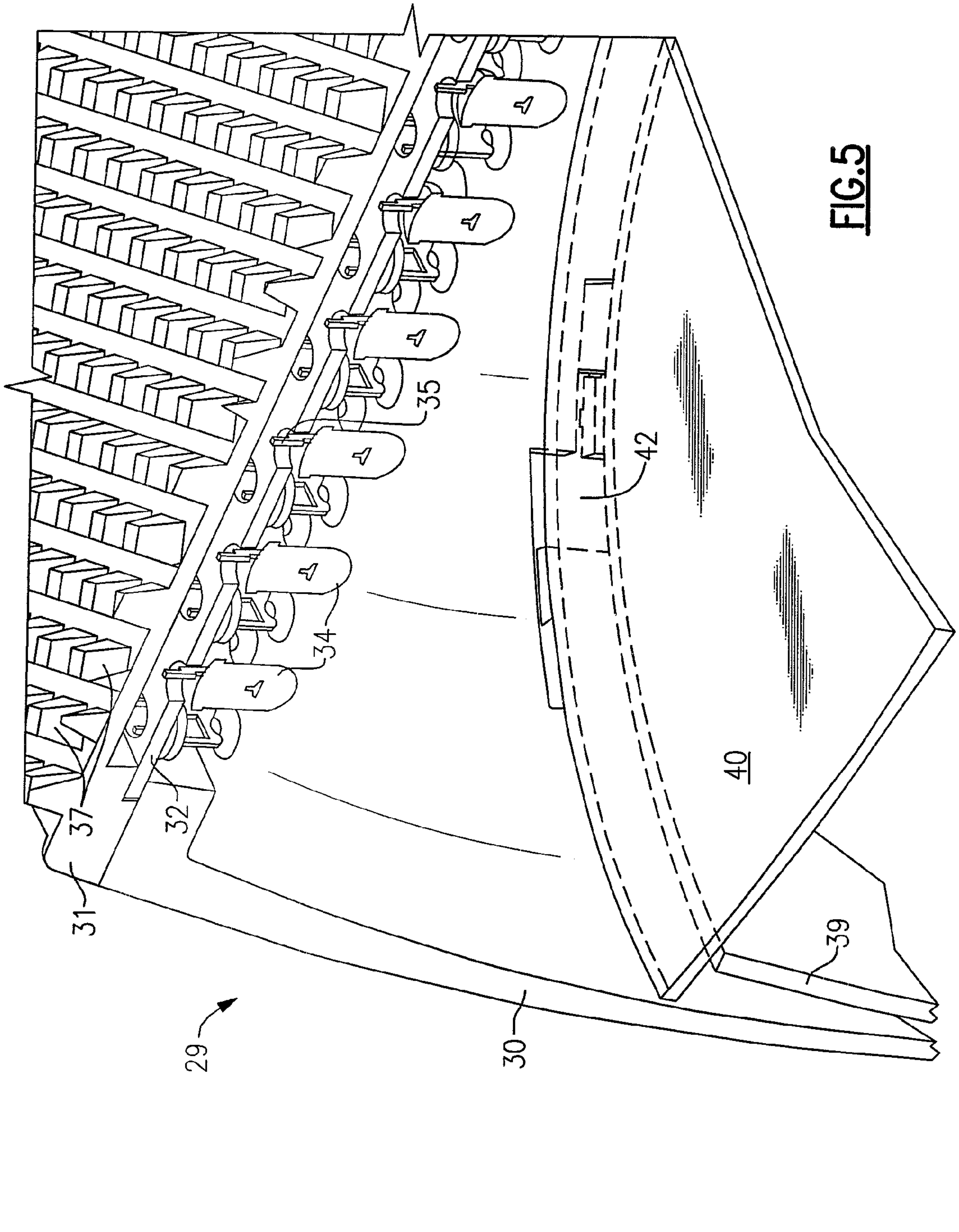
FIG. 5 is a cutaway perspective view of a portion of the lighting assembly depicted in FIG. 2.

FIG. 5 is a cutaway perspective view of a portion of the lighting assembly 29 (without including the heat transfer material 33, and with each solid state light emitter 34 having only a single leg 35)

Figure 6:
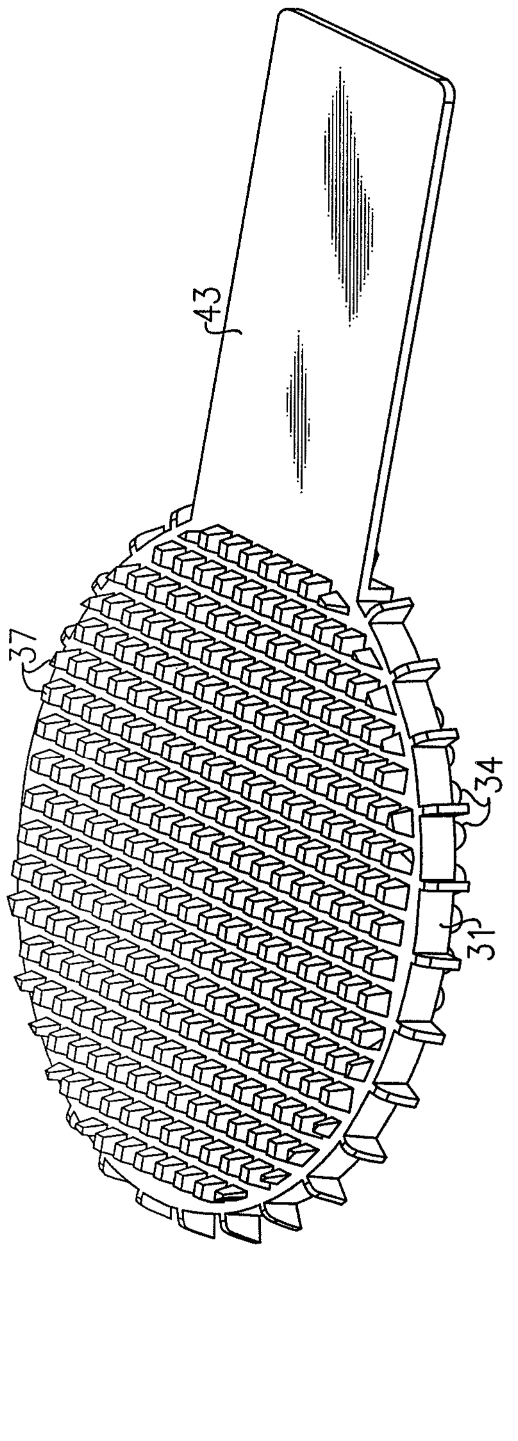
FIGS. 6 and 7 are perspective views of sub-assemblies of the lighting assembly depicted in FIG. 2.
Figure 7:
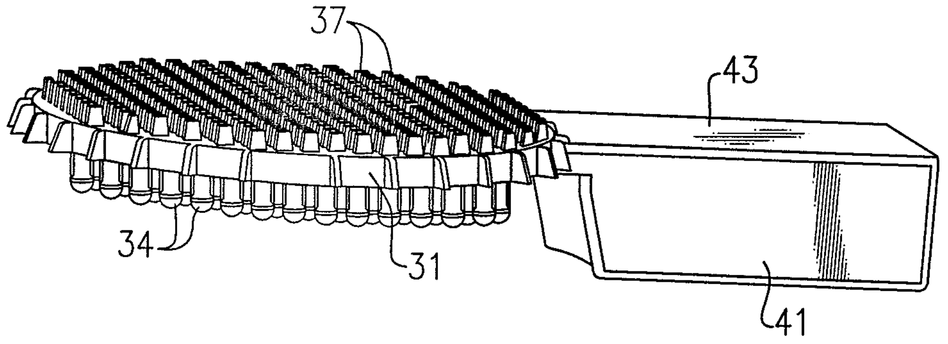

FIGS. 6 and 7 are perspective views of sub-assemblies including the light engine housing 31 (with the heat sink fins 37 formed integrally thereon), the circuit board 32 (not visible in FIG. 6 or in FIG. 7), the heat transfer material 33 (also not visible in FIG. 6 or in FIG. 7), the solid state light emitters 34 (some visible in FIG. 7 and some partially visible in FIG. 6) and a ballast cover 43 (formed integrally with the light engine housing 31). The sub-assembly of FIG. 7 further includes the ballast 41.

Figure 8:
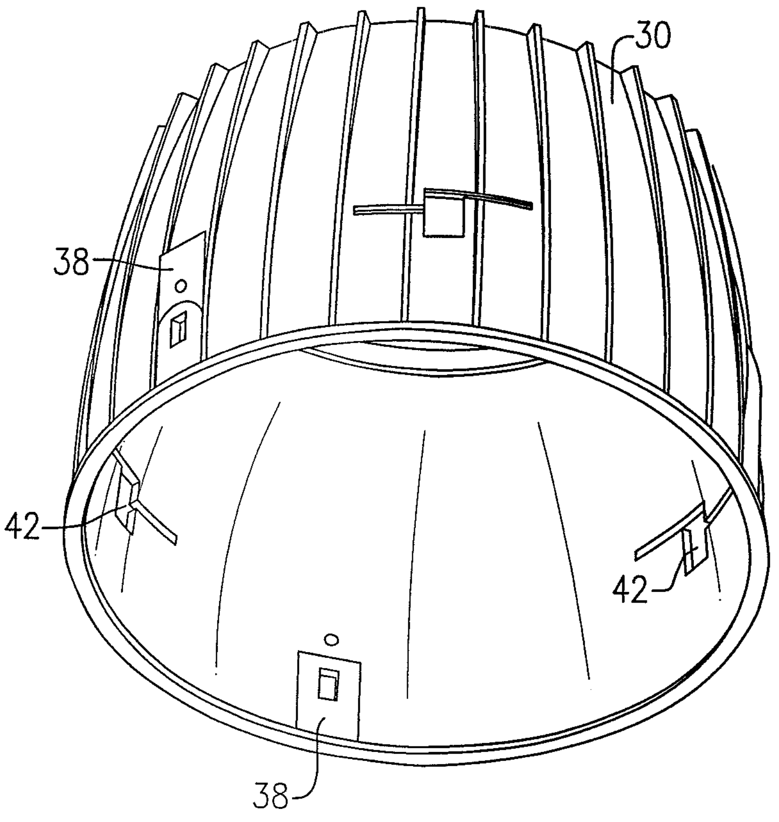
FIG. 8 is a perspective view of the fixture housing of the lighting assembly depicted in FIG. 2, with clips attached thereto and with gaps 42 formed therein.

FIG. 8 is a perspective view of the fixture housing 30, with clips 38 attached thereto and with gaps 42 formed therein.

Figure 9:
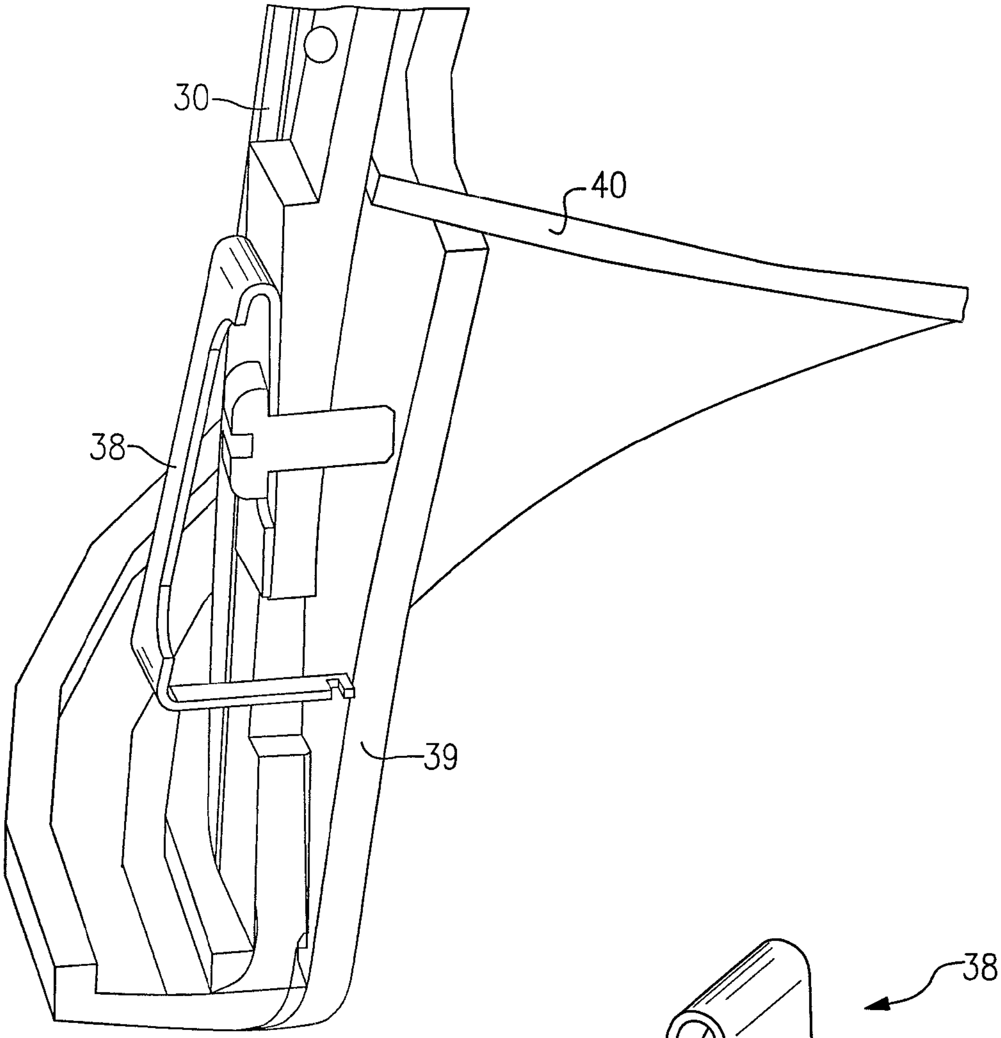
FIG. 9 is a perspective view showing a portion of a clip, a portion of a rim, a portion of a lens and a portion of a fixture housing.

FIG. 9 is a perspective view showing a portion of a clip 38, a portion of a rim 39, a portion of a lens 40 and a portion of a fixture housing 30.

Figure 10:
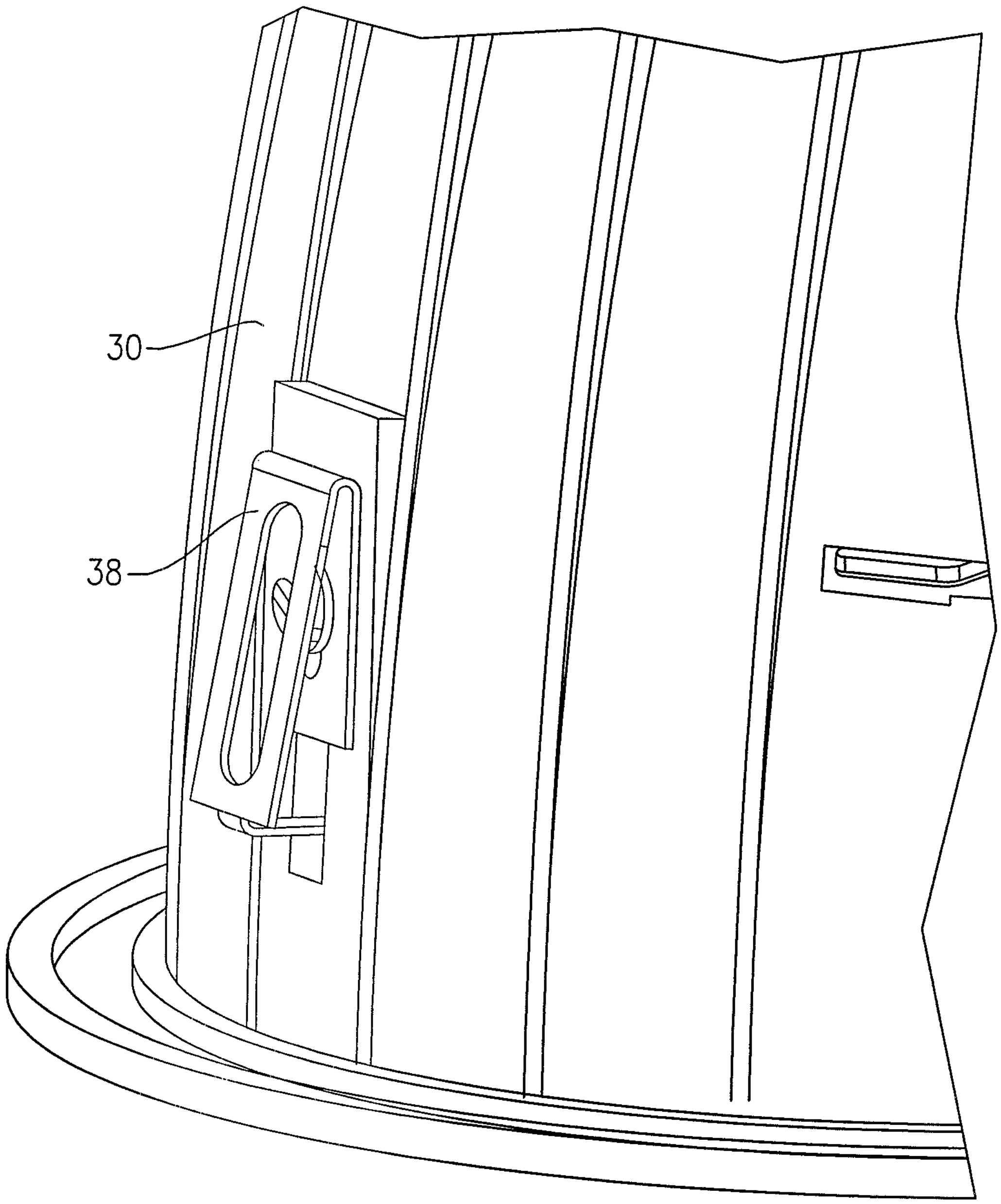
FIG. 10 is a perspective view showing a portion of a clip and a portion of a fixture housing.

FIG. 10 is a perspective view showing a portion of a clip 38 and a portion of a fixture housing 30.

Figure 11:
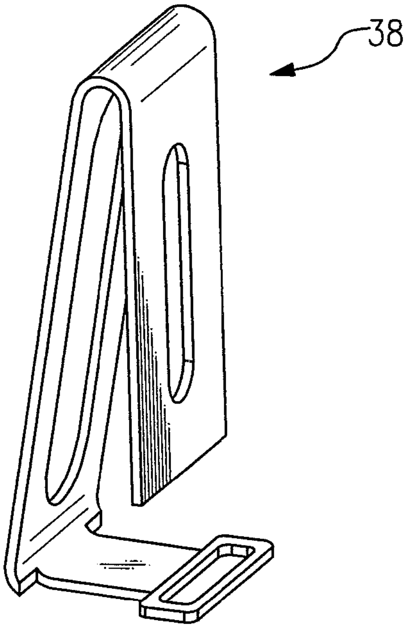
FIG. 11 is a perspective view showing a clip.

FIG. 11 is a perspective view showing a clip 38.

Any two or more structural parts of the lighting assemblies described herein can be integrated. Any structural part of the lighting assemblies described herein can be provided in two or more parts (which are held together, if necessary). Similarly, any two or more functions can be conducted simultaneously, and/or any function can be conducted in a series of steps.

Furthermore, while certain embodiments of the present invention have been illustrated with reference to specific combinations of elements, various other combinations may also be provided without departing from the teachings of the present invention. Thus, the present invention should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

The invention claimed is:

1. A lighting assembly, comprising:
- a fight engine housing;
- a circuit board;
- a heat transfer material;
- at least a first electrically conductive leg; and
- at least a first solid state light emitter,
- said first solid state light emitter in contact with a first end of said first electrically conductive leg,
- said heat transfer material in contact with said light engine housing,
- said light engine housing having at least a first surface and a second surface,
- at least a portion of said first surface exposed to an exterior of said lighting assembly,
- a recess defined by said second surface of said light engine housing,
- a first surface of said circuit board in contact with a portion of said second surface of said light engine housing that extends around a periphery of said recess,
- said heat transfer material completely filling said recess between said light engine housing and said first surface of said circuit board,
- said first electrically conductive leg extending through said circuit board,
- a second end of said first electrically conductive leg extending (1) toward said portion of said light engine housing which is exposed to an exterior of said lighting assembly and (2) into said heat transfer material.

2. A lighting assembly as recited in claim 1, wherein said lighting assembly further comprises a fixture housing, and an axis of symmetry of said fixture housing is substantially co-linear with an axis of symmetry of said light engine housing.

3. A lighting assembly as recited in claim 2, wherein an axis of symmetry of said first leg is substantially parallel to said axis of symmetry of said light engine housing.

4. A lighting assembly as recited in claim 2, wherein an axis of symmetry of said first solid state light emitter is substantially parallel to said axis of symmetry of said light engine housing.

5. A lighting assembly as recited in claim 1, wherein heat sink fins extend from said light engine housing away from said heat transfer material.

6. A lighting assembly as recited in claim 1, wherein said heat transfer material comprises at least one material selected from the group consisting of epoxy and silicon carbide.

7. A lighting assembly as recited in claim 1, wherein said lighting assembly further comprises a fixture housing and at least two clips, said two clips attached to said fixture housing and extending away from a periphery of said fixture housing.

8. A lighting assembly as recited in claim 1, wherein said lighting assembly further comprises a fixture housing and a rim, said rim having a rim external surface and a rim internal surface, said fixture housing having a fixture housing internal surface, said rim external surface facing said fixture housing internal surface.

9. A lighting assembly as recited in claim 8, wherein:
- said lighting assembly further comprises a fixture housing, at least two clips, and at least a first drawstring, said two clips attached to said fixture housing and extending away from a periphery of said fixture housing, and
- said first drawstring, when pulled, causes said clips to retract toward said periphery of said fixture housing, said rim obstructing said first drawstring from view through an opening defined by said rim internal surface.

10. A lighting assembly as recited in claim 8, further comprising at least a first control device attached to said fixture housing, said rim obstructing said first control device from view through an opening defined by said rim internal surface.

11. A lighting assembly as recited in claim 8, further comprising mounting screws which connect said fixture housing to a construction element, said rim internal surface defining an opening through which light from said at least a first solid state light emitter can pass, said rim obstructing the mounting screws from view through said opening.

12. A lighting assembly as recited in claim 1, wherein said first electrically conductive leg extends into said heat transfer material at least 50% of a distance from said circuit board to a surface of said light engine housing which is opposite said circuit board relative to said heat transfer material.

13. A lighting assembly as recited in claim 1, wherein said first electrically conductive leg extends into said heat transfer material at least 75% of a distance from said circuit board to a surface of said light engine housing which is opposite said circuit board relative to said heat transfer material.

14. A lighting assembly as recited in claim 1, wherein said first electrically conductive leg extends into said heat transfer material at least 90% of a distance from said circuit board to a surface of said light engine housing which is opposite said circuit board relative to said heat transfer material.

15. A lighting assembly, comprising:
- a light engine housing;
- a circuit board;
- at least a first solid state light emitter; and
- a heat transfer material,
- said light engine housing having at least a first surface and a second surface,
- a recess defined by said second surface of said light engine housing,
- a first surface of said circuit board in contact with a portion of said second surface of said light engine housing that extends around a periphery of said recess,
- said heat transfer material completely filling said recess between said first surface of said circuit board and said light engine housing,
- at least a portion of said first surface of said light engine housing exposed to an exterior of said lighting assembly, said circuit board mounted on the light engine housing between (1) said first solid state light emitter and (2) said portion of said surface of said light engine housing which is exposed to an exterior of said lighting assembly.

16. A lighting assembly as recited in claim 15, wherein said lighting assembly further comprises at least a first electrically conductive leg, said first electrically conductive leg extending into said heat transfer material at least 50% of a distance from said circuit board to a surface of said light engine housing which is opposite said circuit board relative to said heat transfer material.

17. A lighting assembly as recited in claim 15, wherein said lighting assembly further comprises at least a first electrically conductive leg, said first electrically conductive leg extending into said heat transfer material at least 75% of a distance from said circuit board to a surface of said light engine housing which is opposite said circuit board relative to said heat transfer material.

18. A lighting assembly as recited in claim 15, wherein said lighting assembly further comprises at least a first electrically conductive leg, said first electrically conductive leg extending into said heat transfer material at least 90% of a distance from said circuit board to a surface of said light engine housing which is opposite said circuit board relative to said heat transfer material.

19. A lighting assembly as recited in claim 15, wherein said lighting assembly further comprises at least a first electrically conductive leg, and an axis of symmetry of said first leg is substantially parallel to an axis of symmetry of said light engine housing.

20. A lighting assembly as recited in claim 15, wherein an axis of symmetry of said first solid state light emitter is substantially parallel to an axis of symmetry of said light engine housing.

21. A lighting assembly as recited in claim 15, wherein said lighting assembly further comprises heat sink fins, and said heat sink fins extend from said light engine housing away from said heat transfer material.

22. A lighting assembly as recited in claim 15, wherein said heat transfer material comprises at least one material selected from the group consisting of epoxy and silicon carbide.

23. A lighting assembly, comprising:

a light engine housing;

a circuit board;

at least a first solid state light emitter;

at least a first electrically conductive leg, and means for transferring heat from said first solid state light emitter, said circuit board mounted on the light engine housing between (1) said first solid state light emitter and (2) a portion of a surface of said light engine housing which is exposed to an exterior of said lighting assembly, said first solid state light emitter in contact with a first end of said first electrically conductive leg, said means for transferring heat from said first solid state light emitter in contact with said light engine housing, said first electrically conductive leg extending through said circuit board, a second end of said first electrically conductive leg extending (1) toward said portion of said light engine housing which is exposed to an exterior of said lighting assembly and (2) into said means for transferring heat from said first solid state light emitter, said light engine housing having at least a first surface and a second surface, at least a portion of said first surface exposed to an exterior of said lighting assembly, a recess defined by said second surface of said light engine housing, a first surface of said circuit board in contact with a portion of said second surface of said light engine housing that extends around a periphery of said recess, said heat transfer means completely filling said recess between said light engine housing and said first surface of said circuit board.

24. A method of installing a lighting assembly, comprising:

connecting an electrical conductor on a lighting assembly to an electrical supply component, said lighting assembly comprising a light engine housing, a circuit board, a heat transfer material, at least a first electrically conductive leg, and at least a first solid state light emitter, said first solid state light emitter in contact with a first end of said first electrically conductive leg, said heat transfer material in contact with said light engine housing, said light engine housing having at least one surface, at least a portion of which is exposed to an exterior of said lighting assembly, said first electrically conductive leg extending through said circuit board, a second end of said first electrically conductive leg extending (1) toward said portion of said light engine housing which is exposed to an exterior of said lighting assembly and (2) into said heat transfer material, said light engine housing having at least a first surface and a second surface, at least a portion of said first surface exposed to an exterior of said lighting assembly, a recess defined by said second surface of said light engine housing, a first surface of said circuit board in contact with a portion of said second surface of said light engine housing that extends around a periphery of said recess, said heat transfer material completely filling said recess between said light engine housing and said first surface of said circuit board.

25. A method as recited in claim 24, wherein said construction element is selected from the group consisting of a wall, a floor and a ceiling.

26. A method as recited in claim 24, further comprising positioning a lens in said lighting assembly and turning said lens, whereby said lens becomes engaged with said lighting assembly and is held in place.

27. A method as recited in claim 26, wherein said turning said lens comprises rotating said lens about an axis substantially coaxial with an axis of said lighting assembly.

28. A method as recited in claim 24, further comprising positioning a rim such that an external surface of said rim faces an internal surface of said lighting assembly.

29. A method as recited in claim 24, wherein said electrical supply component comprises an electrical wire.

30. A method as recited in claim 24, wherein said first solid state light emitter is an LED.

31. A method of changing a light emitter in a lighting assembly, comprising:

retracting clips attached to a lighting assembly out of contact with a construction element;

moving said lighting assembly through a hole in a construction element, said lighting assembly comprising a light engine housing, a circuit board, a heat transfer material, and at least a first solid state light emitter, said light engine housing having at least a first surface and a second surface, at least a portion of said first surface exposed to an exterior of said lighting assembly, said heat transfer material in contact with said first surface, said circuit board mounted on the light engine housing between (1) said first solid state light emitter and (2) said portion of said surface of said light engine housing which is exposed to an exterior of said lighting assembly, a recess defined by said second surface of said light engine housing, a first surface of said circuit board in contact with a portion of said second surface of said light engine housing that extends around a periphery of said recess, said heat transfer material completely filling said recess between said light engine housing and said first surface of said circuit board.

32. A method as recited in claim 31, wherein:

said lighting assembly comprises a fixture housing, said light engine housing, a light engine and at least a first light emitter, said first light emitter mounted on said light engine, said light engine mounted on said light engine housing, and said method further comprises:

removing said light engine housing from said fixture housing;

removing said light engine from said light engine housing;

attaching a replacement light engine to said light engine housing; and attaching said light engine housing to said fixture housing.

33. A method as recited in claim 32, wherein said method further comprises inserting said lighting assembly through said hole in said construction element such that said clips engage said construction element.

34. A method as recited in claim 31, wherein:

said lighting assembly comprises a fixture housing, said light engine housing, a light engine and at least a first light emitter, said first light emitter mounted on said light engine, said light engine mounted on said light engine housing, and said method further comprises:

removing said light engine housing from said fixture housing;

removing said first light emitter from said light engine;

attaching a replacement light emitter on said light engine; and attaching said light engine housing to said fixture housing.

35. A method as recited in claim 34, wherein said method further comprises inserting said lighting assembly through said hole in said construction element such that said clips engage said construction element.

36. A method as recited in claim 34, wherein said method further comprises inserting said lighting assembly through a second hole in a second construction element such that said clips engage said second construction element.

37. A method as recited in claim 31, wherein:

said lighting assembly comprises:

a fixture housing;

said light engine housing;

said circuit board;

said heat transfer material;

at least a first electrically conductive leg; and at least said first solid state light emitter, said first solid state light emitter is in contact with a first end of said first electrically conductive leg, said first electrically conductive leg extends through said circuit board, a second end of said first electrically conductive leg extends into said heat transfer material.

38. A method as recited in claim 37, wherein said first emitter is a solid state light emitter.

39. A method as recited in claim 38, wherein said solid state light emitter is an LED.

40. A lighting assembly as recited in claim 15, wherein:

said lighting assembly further comprises at least a first electrically conductive leg, said first solid state light emitter is in contact with a first end of said first electrically conductive leg, said first electrically conductive leg extends through said circuit board, and a second end of said first electrically conductive leg extends into said heat transfer material.

41. A lighting assembly as recited in claim 37, wherein:

said electrically conductive leg is electrically connected to said electrical conductor, said heat transfer material is in contact with said light engine housing, and said light engine housing is connected to said fixture housing.

* * * * *

UNITED STATES PATENT AND TRADEMARK OFFICE

CERTIFICATE OF CORRECTION

PATENT NO. : 8,827,507 B2
APPLICATION NO. : 11/859048
DATED : September 9, 2014
INVENTOR(S) : Antony Paul Van De Ven et al.

It is certified that error appears in the above-identified patent and that said Letters Patent is hereby corrected as shown below:

In The Specification

Column 8, lines 34-35

Please correct: “(now U.S. Patent Publication No. 2007/023611);” to -- “(now U.S. Patent Publication No. 2007/0236911);” --

In The Claims

Column 17, line 30 (claim 1)

Please correct: “a fight engine housing;” to -- a light engine housing; --

Signed and Sealed this
Twentieth Day of January, 2015

Michelle K. Lee

Michelle K. Lee
*Deputy Director of the United States Patent and Trademark Office*